US005156184A

United States Patent [19]

Kolchinsky

[11] Patent Number: 5,156,184

[45] Date of Patent: Oct. 20, 1992

[54] SOLENOID OPERATED TRANSMISSION CARTRIDGE VALVE

[75] Inventor: Abel E. Kolchinsky, Riverwoods, Ill.

[73] Assignee: Sterling Hydraulics, Inc., Schaumburg, Ill.

[21] Appl. No.: 779,632

[22] Filed: Oct. 21, 1991

[51] Int. Cl.[5] .................... F16K 51/00

[52] U.S. Cl. .................... 137/454.5; 137/625.65; 251/129.2

[58] Field of Search .................... 137/625.65, 454.5; 251/129.2

[56] References Cited

U.S. PATENT DOCUMENTS 2,930,404 3/1960 Kowalski et al. .............. 137/625.65
3,016,920 1/1962 Thomsen et al. .............. 137/625.65
3,444,895 5/1969 Schnittker .............. 137/625.65
3,815,633 6/1974 Greenwood et al. .............. 137/625.65
4,655,254 4/1987 Häfner et al. .............. 137/625.65

*Primary Examiner*—A. Michael Chambers
*Attorney, Agent, or Firm*—Wood, Phillips, Van Santen, Hoffman & Ertel

[57] ABSTRACT

A low cost valve results from the use of a single machined part for a valve housing. The housing is made of a non-magnetic material which can be less expensive and eliminates the requirement for screens or filters in automotive applications. A tube stop is threadably connected to the valve housing eliminating the requirement of brazing in manufacturing. Finally, a biasing spring acting on a plunger pin eliminates the requirement for providing a counterbore in the plunger for maintaining the plunger and thus a valve member in the normal or unactuated position.

16 Claims, 2 Drawing Sheets 84 28 82 92 86 70 76 36 22 32 90 88 24 66 38 58 56 42 64 40 52 30 82 34 68 60 54 26 44 50 80 64 38 48 40 42 46 72 78 74 10

30
34
26
44
54
46
42
60
42
56
52
40
40
58
68
48
38
38
64
64
66
32
78
76
80
22
24
50
70
10
72
36
92
74
82
28
84
86
88
90
82

SOLENOID OPERATED TRANSMISSION CARTRIDGE VALVE

FIELD OF THE INVENTION

This invention relates to valves and, more particularly, to a two position solenoid operated transmission type cartridge valve.

BACKGROUND OF THE INVENTION

In one form of a fluid flow control valve, a flow control element or valve member is movably positioned in a valve chamber between first and second valve positions for selectively fluidically coupling valve ports. The flow control element may be directly actuated by a solenoid operated plunger operatively associated with the flow control element. The solenoid coil controllably positions the plunger to move the flow control element to an actuated position.

Typically, the valve chamber is provided by a valve housing of a magnetic material capable of withstanding high fluid pressure. The plunger is slidably received in a sleeve brazed between the valve housing and a tube stop. To bias the plunger to a normal, or unactuated position, the plunger typically includes a counter bore at either end receiving a spring biasing the plunger in a suitable direction. This type of assembly requires increased manufacturing costs.

A typical application for a cartridge valve of the three way, two position type is in an automobile transmission for switching clutches and the like. Typically, the clutches are single acting cylinders operated at relatively low pressure on the order of five to six hundred psi, with one thousand psi being a maximum. As a plurality of valves may be necessary in such applications, economies in manufacturing are desirable to provide cost effective solutions to satisfy control requirements.

An additional problem in transmission applications results from the use of cartridge valves having magnetic housings. In an automotive transmission box, metallic chips and the like may result from gear wearout. Energization of the solenoid in proximity to a magnetic valve housing attracts the chips causing valve sticking problems. This problem can be minimized using filters or screens in valve manifolds or the like. Here, again, additional parts and expense results.

The present invention overcomes one or more of the problems discussed above.

DESCRIPTION OF THE INVENTION

According to the invention, a cartridge valve is provided which can be manufactured for relatively low cost.

Broadly, there is disclosed herein in accordance with one aspect of the invention a solenoid operated cartridge valve comprising an elongate one-piece cylindrical valve housing having an axial through bore defining an interior chamber. One end of the housing comprises a port end and includes a plurality of port openings, and an axial opposite end comprises a sleeve end receivable in a solenoid, in use. A valve member is movable in the chamber at the port end between first and second valve positions for selectively coupling the port openings. A solenoid plunger is movable in the chamber at the sleeve end operatively associated with the valve member for positioning the valve member. A stop or stationary armature is mounted to the valve housing at the sleeve end for retaining the plunger in the chamber. Biasing means operatively associated with the plunger normally maintain the valve member in one of the first and second positions.

It is a feature of the invention that the valve housing is of non-magnetic material.

It is another feature of the invention to provide means for connecting the valve member to the plunger for axial movement therewith.

It is a further of the invention that the biasing means comprises a spring received in the chamber and acting between the stop and the plunger for normally maintaining the valve member in one of the first and second positions.

It is an additional feature of the invention that the stop is threadably mounted to the valve housing at the sleeve end.

There is disclosed in accordance with another aspect of the invention a solenoid operated cartridge valve comprising an elongate cylindrical valve housing having an axial through bore with an intermediate shoulder separating the bore into a valve chamber and a plunger chamber, one end of the housing comprising the port end including a plurality of port openings into the valve chamber, and an axial opposite end comprising a sleeve end receivable in a solenoid, in use. A valve member having an axial bore is movable in the valve chamber between first and second valve positions for selectively fluidically coupling the port openings. A solenoid plunger is movable in the plunger chamber and has an axial through bore. A rod has one end fastened to the valve member and an opposite end received and fastened in the plunger bore for coupling the plunger to the valve member for axial movement therewith. A stop is mounted to the valve housing at the sleeve end for retaining the plunger in the valve chamber for movement between the stop and the shoulder. Biasing means operatively associated with the plunger normally maintain the valve member in one of the first and second positions.

It is a feature of the invention to provide a pin extending through radially extending openings in the plunger and the rod for fastening the rod to the plunger.

It is yet another feature of the invention that the biasing means comprises a spring received in the plunger bore and acting between the stop and the rod for normally maintaining the valve member in one of the first and second positions.

In accordance with the invention, a lower cost valve results from the use of a single machined part for the valve housing. Moreover, the housing is made of a non-magnetic material which can be less expensive and eliminates the requirement for screens or filters in automotive applications. Similarly, threadably connecting the tube stop to the valve housing sleeve end eliminates the requirement of brazing in manufacturing. Finally, the biasing spring acting on the pin eliminates the requirement for providing a counterbore in the plunger for maintaining the plunger and thus the valve member in the normal or unactuated position.

Further features and advantages of the invention will readily be apparent from the specification and from the drawings.

DETAILED DESCRIPTION OF THE INVENTION

Figure 1:
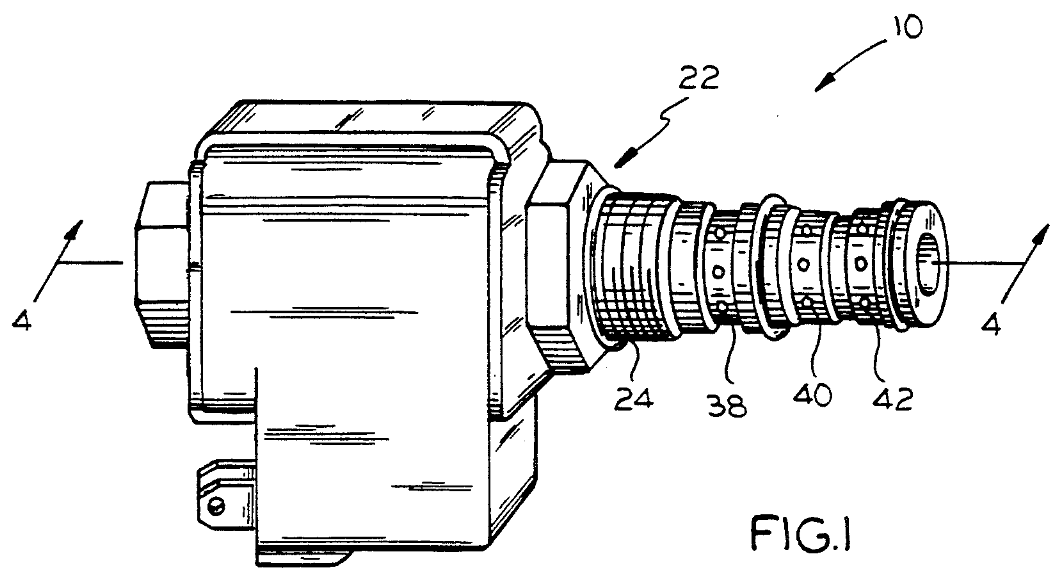
FIG. 1 is a perspective view of a solenoid operated cartridge according to the invention.
Figure 2:
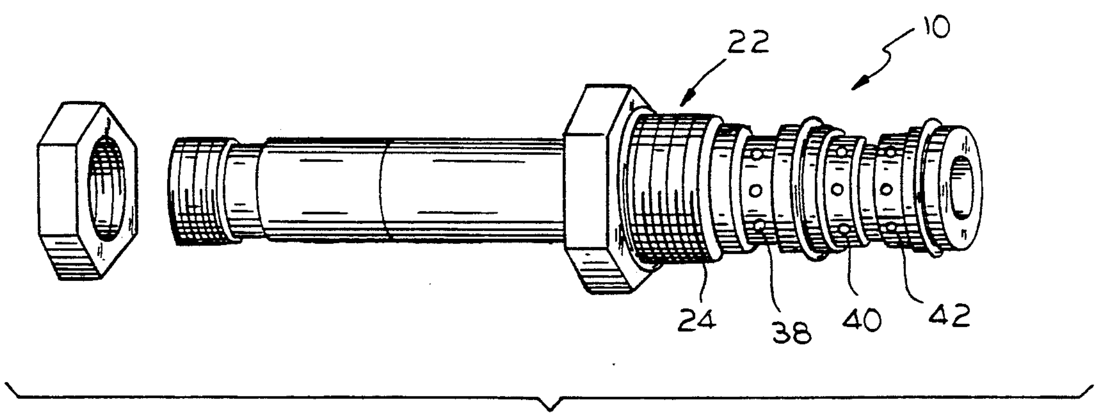
FIG. 2 is an exploded view of the valve of FIG. 1 with the solenoid removed.

FIG. 1 illustrates a solenoid operated transmission cartridge valve 10 according to the invention. The valve 10 includes a stationary valve housing 22 having a threaded outer portion 24 adapted to be threaded into a fluid port (not shown).

Figure 4:
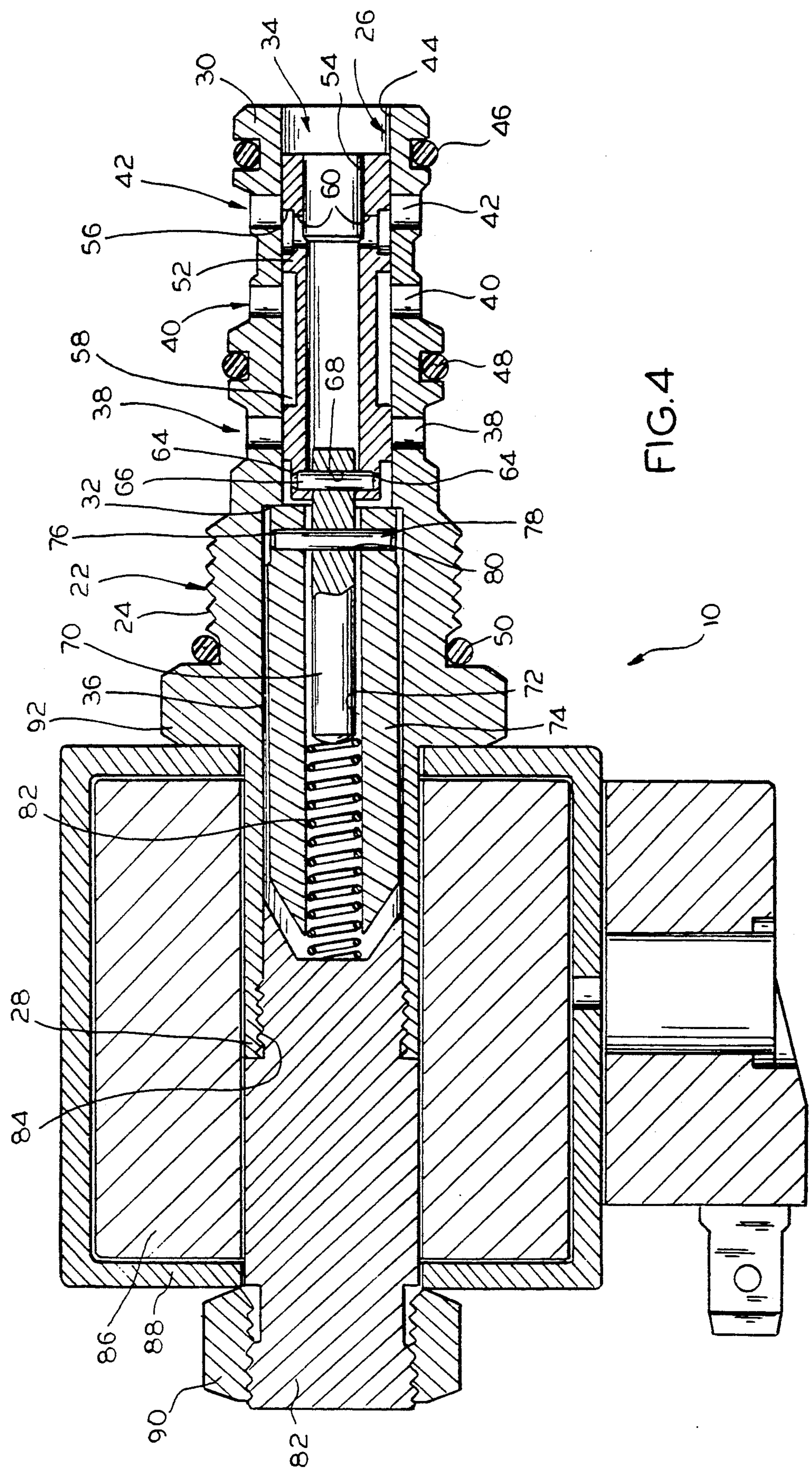
FIG. 4 is a sectional view taken along the line 4—4 of FIG. 1.

With reference also to FIG. 4, the valve housing 22 is of elongate, one-piece cylindrical construction having an axial through bore 26. The bore 26 is of a larger diameter at a sleeve end 28 than at a port end 30 to define an intermediate shoulder 32. The shoulder 32 separates the bore 26 into a valve chamber 34 and a plunger chamber 36.

As used herein, the relative term "outer" or "outward" refers to a direction axially toward the port end 30, and the relative term "inner" or "inward" refers to a direction axially away from the port end 30, i.e., axially toward the sleeve end 28.

The valve housing 22 is provided with three axially spaced groups of circumferentially spaced side ports or openings 38, 40 and 42 that open radially inwardly into the valve chamber 34. An outer end of the bore 26 comprises an end port 44. A first sealing ring 46 is provided on the valve housing 22 for sealing the end port 44 from the ports 38, 40 and 42. A second sealing ring 48 is provided between the first and second groups of openings 38 and 40 for sealing the same from one another. A third sealing ring 50 is provided for sealing the valve 10 within the fluid port.

Advantageously, the valve housing 22 is of a nonmagnetic material such as, for example, aluminum, brass, bronze or stainless steel. The use of such a nonmagnetic material is believed less expensive than a magnetic material and eliminates the requirement for filters or screens in fluid ports in use.

A flow control element as a valve member 52 is movable in the valve chamber 34 between first and second valve positions for selectively fluidically coupling the port openings 38, 40, 42 and 44. Particularly, the valve member is of cylindrical construction including an axial through bore 54. The outer diameter of the valve member 52 is slightly less than the inner diameter of the valve housing axial bore 26 at the port end 30. A first annular circumferential groove 56 is provided proximate an outer end of the valve member 52. An elongate circumferential annular groove 58 is centrally located on the valve member 52. A plurality of circumferentially spaced openings 60 open radially inwardly from the axial outer openings 56 into the through bore 54.

Figure 3:
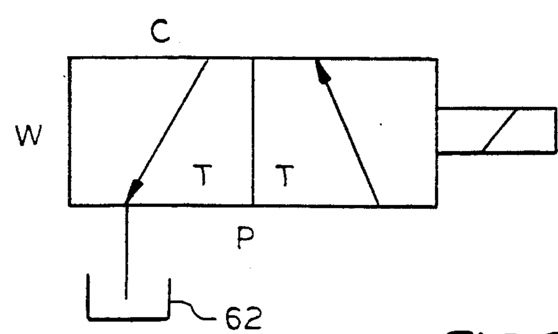
FIG. 3 is a hydraulic schematic of the valve of FIG. 1.

In the normal or first valve position, as illustrated in FIG. 4, the end port 44 is connected through the valve member bore 54 and opening 60 to the third port openings 42. In an actuated, or second, position, the valve member 52 moves inwardly to cover the third port openings 42 and the central annular groove 58 provides fluidic coupling between the first openings 38 and the second openings 40. Typically, in an application for controlling a single acting cylinder, the end port 44 is connected to a tank 62, see FIG. 3, the first port openings 38 are connected to a source of pressure, labelled "P", while the second and third openings 40 and 42 are connected to the cylinder. Thus, in the normal unactuated position, the cylinder is evacuated to the tank 62, while in the actuated position, the source of pressure is connected to the cylinder.

The valve member 52 includes at its inner end a pair of opposite radial openings 64 receiving a pin 66. The pin 66 extends through a radial through opening 68 of an elongate rod 70. The rod 70 extends inwardly and is received in an axial through bore 72 of a plunger 74. The plunger 74 is entirely received within the plunger chamber 36. An outer end of the plunger 74 includes opposite openings 76 opening into the bore 72 and receiving a pin 78. The pin 78 is in turn received in a radially extending opening 80 through the rod 70. Thus, the pins 80 and 68 connect the valve member 50 to the plunger 74 for movement therewith via the rod 70.

In a normal arrangement of the valve 10, a helical coil spring 82 received in the plunger bore 72 acts between the rod 70 and a stationary armature or stop 82 to bias the plunger 74, rod 70 and valve member 52 outwardly. Movement is limited by the plunger 74 engaging the shoulder 32. The stop 82 is threadably received in the housing sleeve end 28 as at 84. A settable liquid bonding agent can be used at the threaded connection 84 to seal the same. Because the intended use of the valve 10 is in relatively low pressure application, i.e. controlling fluid pressure less than one thousand psi, the threaded connection 84, which requires a thicker wall at the sleeve end 28, does not impede performance.

In order to actuate the valve 10, a solenoid coil 86, surrounded by an outer metal yoke 88, is received around the housing sleeve end 28 and the stop 82. A nut 90 is threaded at an inner end of the stop 82 and retains the solenoid 86 positioned between the nut and a coupling nut portion 92 of the valve housing 22 intermediate the port end 30 and sleeve end 28.

When the solenoid 86 is energized, it develops a magnetic field in space occupied by the plunger 74 to move the plunger 74 inwardly against the force of the spring 82 to move the valve member 52 to the actuated position, discussed above. Deenergization of the solenoid 86 eliminates the force on the plunger so that the coil spring 82 returns the valve member 52 to the normal position illustrated.

Thus, in accordance with the invention, there is disclosed a low cost solenoid operated cartridge valve suitable for use in automotive environments. Economies of manufacturing are provided by the use of a one piece valve housing for housing the valve member 52 and plunger 74 and made of a non-magnetic material. Further, utilizing the coil spring 82 acting directly on the rod 70 renders manufacture of the plunger 74 less costly. Similarly, the use of the one piece housing and the threaded connection between the valve housing 22 and stop 82 eliminates the requirement for any brazing in manufacturing.

I claim:

1. A solenoid operated cartridge valve comprising:

an elongate one-piece cylindrical valve housing having an axial through bore defining an interior chamber, one end of said housing comprising a port end including a plurality of port openings, and an axial opposite end comprising a sleeve end receivable in a solenoid, in use;

a valve member movable in said chamber at the port end between first and second valve positions for selectively coupling said port openings;

a solenoid plunger movable in said chamber at the sleeve end operatively associated with the valve member for positioning the valve member;

a stop mounted to said valve housing at the sleeve end for retaining the plunger in said chamber; and biasing means operatively associated with said plunger for normally maintaining said valve member in one of said first and second positions.

2. The cartridge valve of claim 1 wherein said valve housing is of non-magnetic material.

3. The cartridge valve of claim 1 further comprising means for connecting said valve member to said plunger for axial movement therewith.

4. The cartridge valve of claim 1 wherein said biasing means comprises a spring received in said chamber and acting between said stop and said plunger for normally maintaining said valve member in one of said first and second positions.

5. The cartridge valve of claim 1 wherein said stop is threadably mounted to said valve housing at the sleeve end.

6. A two position solenoid operated cartridge valve comprising:

an elongate one-piece cylindrical valve housing having an axial through bore with an intermediate shoulder separating said bore into a valve chamber and a plunger chamber, one end of said housing comprising a port end including a plurality of port openings into said valve chamber, and an axial opposite end comprising a sleeve end receivable in a solenoid, in use;

a valve member movable in said valve chamber between first and second valve positions for selectively fluidically coupling said port openings;

a solenoid plunger movable in said plunger chamber operatively associated with the valve member for positioning the valve member;

a stop mounted to said valve housing at the sleeve end for retaining the plunger in said valve chamber for movement between the stop and the shoulder; and biasing means operatively associated with said plunger for normally maintaining said valve member in one of said first and second positions.

7. The cartridge valve of claim 6 wherein said valve housing is of non-magnetic material.

8. The cartridge valve of claim 6 further comprising means for connecting said valve member to said plunger for axial movement therewith.

9. The cartridge valve of claim 6 wherein said biasing means comprises a spring received in said chamber and acting between said stop and said plunger for normally maintaining said valve member in one of said first and second positions.

10. The cartridge valve of claim 6 wherein said stop is threadably mounted to said valve housing at the sleeve end.

11. A solenoid operated cartridge valve comprising:

an elongate cylindrical valve housing having an axial through bore with an intermediate shoulder separating said bore into a valve chamber and a plunger chamber, one end of said housing comprising a port end including a plurality of port openings into said valve chamber, and an axial opposite end comprising a sleeve end receivable in a solenoid, in use;

a valve member movable in said valve chamber between first and second valve positions for selectively fluidically coupling said port openings;

a solenoid plunger movable in said plunger chamber and having an axial through bore;

a rod having one end fastened to said valve member and an opposite end received and fastened in said plunger bore for coupling said plunger to the valve member for axial movement therewith;

a stop mounted to said valve housing at the sleeve end for retaining the plunger in said valve chamber for movement between the stop and the shoulder; and biasing means operatively associated with said plunger for normally maintaining said valve member in one of said first and second positions.

12. The cartridge valve of claim 11 wherein said valve housing is of non-magnetic material.

13. The cartridge valve of claim 11 further comprising a pin extending through radially extending openings in said plunger and said rod for fastening said rod to said plunger.

14. The cartridge valve of claim 11 wherein said biasing means comprises a spring received in said plunger bore and acting between said stop and said rod for normally maintaining said valve member in one of said first and second positions.

15. The cartridge valve of claim 11 wherein said stop is threadably mounted to said valve housing at the sleeve end.

16. The cartridge valve of claim 11 wherein said valve member includes an axial bore and further comprising a pin extending through radially extending openings in said valve member and said rod for fastening said rod to said valve member.

* * * * *